(12) United States Patent
Chow et al.

(10) Patent No.: US 12,023,974 B2
(45) Date of Patent: Jul. 2, 2024

(54) CLEVIS-ENDED SUSPENSION STRUT MANUFACTURED WITHOUT WELDS

(71) Applicant: Caterpillar Inc., Peoria, IL (US)

(72) Inventors: Jeffrey Chow, Chicago, IL (US); Kurt S. Goslovich, Naperville, IL (US)

(73) Assignee: Caterpillar Inc., Peoria, IL (US)

( * ) Notice: Subject to any disclaimer, the term of this patent is extended or adjusted under 35 U.S.C. 154(b) by 622 days.

(21) Appl. No.: 16/926,213

(22) Filed: Jul. 10, 2020

(65) Prior Publication Data
US 2022/0009302 A1    Jan. 13, 2022

(51) Int. Cl.
*B60G 13/08*    (2006.01)
*B21K 1/06*    (2006.01)
(Continued)

(52) U.S. Cl.
CPC ............ *B60G 13/08* (2013.01); *B21K 1/06* (2013.01); *B60G 13/06* (2013.01); *B60G 17/08* (2013.01); *F16F 9/0236* (2013.01); *F16F 9/063* (2013.01); *F16F 9/182* (2013.01); *F16F 9/19* (2013.01); *F16F 9/3242* (2013.01);
(Continued)

(58) Field of Classification Search
CPC .... F16F 9/437; F16F 9/486; F16F 9/32; F16F 9/3228; F16F 9/34; F16F 9/48; F16F 9/3271; F16F 9/063; F16F 9/0236; F16F 9/3242; F16F 2234/02; F16F 2222/12; F16F 2230/0005; F16F 2230/06; F16F 2230/16; F16F 2230/30; F16F 2230/186; F16F 2224/0208; F16F 2226/04; F16F 2222/126; B60G 13/06; B60G 17/08; B60G 2202/24; B60G 2202/242; B60G 2206/41; B60G 2206/012; B60G 2206/81022; B60G 2206/72; B60G 2204/128; B60G 2204/129; B60G 2500/30; B60G 2800/162; B21K 1/06; G01G 19/08; G01G 19/10
See application file for complete search history.

(56) References Cited

U.S. PATENT DOCUMENTS 3,387,856 A    6/1968    Guilhamat
3,624,456 A    11/1971    Elliot et al.
(Continued)

FOREIGN PATENT DOCUMENTS

DE    4108801 A1 *    9/1992
JP    H11294512 A    10/1999
(Continued)

*Primary Examiner* — Vishal R Sahni
(74) *Attorney, Agent, or Firm* — Xsensus, LLP

(57) ABSTRACT

In accordance with one aspect of the present disclosure, a suspension strut for use on a work machine is provided. The suspension strut may have a forged one piece cylindrical inner housing that includes a hollow rod which forms a circumferential piston at an open end and a lower clevis at a closed end of the hollow rod. The suspension strut may further have a forged one piece cylindrical outer housing that includes a hollow barrel having an interior and an exterior surface, a closed end that forms an upper clevis, an open end, and a port on an outside surface of the hollow barrel. Further, the inner and outer housing may be coupled by a disk shaped end cap attached to the open end of the hollow barrel having an inner diameter that is slideably engaged with an outer surface of hollow rod.

17 Claims, 5 Drawing Sheets

(51) Int. Cl.
*B60G 13/06* (2006.01)
*B60G 17/08* (2006.01)
*F16F 9/02* (2006.01)
*F16F 9/06* (2006.01)
*F16F 9/18* (2006.01)
*F16F 9/19* (2006.01)
*F16F 9/32* (2006.01)
*F16F 9/34* (2006.01)
*F16F 9/36* (2006.01)
*F16F 9/43* (2006.01)

(52) U.S. Cl.
CPC .......... *F16F 9/3271* (2013.01); *F16F 9/3405* (2013.01); *F16F 9/369* (2013.01); *F16F 9/43* (2013.01); *F16F 9/437* (2013.01); *B60G 2202/24* (2013.01); *B60G 2202/242* (2013.01); *B60G 2204/128* (2013.01); *B60G 2204/129* (2013.01); *B60G 2206/012* (2013.01); *B60G 2206/41* (2013.01); *B60G 2206/72* (2013.01); *B60G 2206/81022* (2013.01); *B60G 2500/30* (2013.01); *B60G 2600/20* (2013.01); *B60G 2800/162* (2013.01); *F16F 2222/12* (2013.01); *F16F 2222/126* (2013.01); *F16F 2224/0208* (2013.01); *F16F 2226/04* (2013.01); *F16F 2230/0005* (2013.01); *F16F 2230/06* (2013.01); *F16F 2230/16* (2013.01); *F16F 2230/186* (2013.01); *F16F 2230/30* (2013.01); *F16F 2234/02* (2013.01)

(56) References Cited

U.S. PATENT DOCUMENTS

| | | | | |
|---|---|---|---|---|
| 4,381,857 A | * | 5/1983 | Cook | F16F 9/063 244/104 FP |
| 4,877,222 A | | 10/1989 | Davis | |
| 5,775,677 A | * | 7/1998 | Englund | B62K 25/04 188/322.19 |
| 6,386,088 B1 | * | 5/2002 | Yoshimoto | F15B 15/1447 91/405 |
| 6,561,325 B2 | * | 5/2003 | Zebolsky | F16F 9/063 188/298 |
| 8,448,963 B2 | | 5/2013 | Stander et al. | |
| 9,285,006 B2 | | 3/2016 | Katayama | |
| 9,995,362 B2 | * | 6/2018 | Funato | F16F 9/48 |
| 10,457,011 B2 | | 10/2019 | Stewart | |
| 2005/0167164 A1 | * | 8/2005 | Takeda | B60G 17/018 177/136 |
| 2006/0091591 A1 | * | 5/2006 | Robertson | B60G 7/008 267/64.15 |
| 2012/0153590 A1 | * | 6/2012 | Gilbert | F16F 9/0245 280/124.16 |
| 2012/0205843 A1 | * | 8/2012 | Allen | F16F 9/44 267/64.25 |
| 2014/0062040 A1 | * | 3/2014 | Holden | B60G 15/12 267/64.11 |
| 2015/0211594 A1 | * | 7/2015 | Parizek | F16H 7/08 267/121 |
| 2017/0016505 A1 | * | 1/2017 | Funato | F16F 9/3228 |
| 2017/0204931 A1 | * | 7/2017 | Schmidt | B24C 1/10 |
| 2018/0052037 A1 | * | 2/2018 | Minoshima | B60G 17/0182 |
| 2020/0223276 A1 | * | 7/2020 | Rositch | F16F 9/3235 |
| 2020/0239132 A1 | * | 7/2020 | Mansfield | F16F 9/062 |
| 2020/0254840 A1 | * | 8/2020 | Rositch | B60G 15/12 |
| 2022/0009302 A1 | * | 1/2022 | Chow | B21K 1/06 |

FOREIGN PATENT DOCUMENTS

| | | |
|---|---|---|
| JP | H11294513 A | 10/1999 |
| WO | 2019097211 | 5/2019 |

* cited by examiner

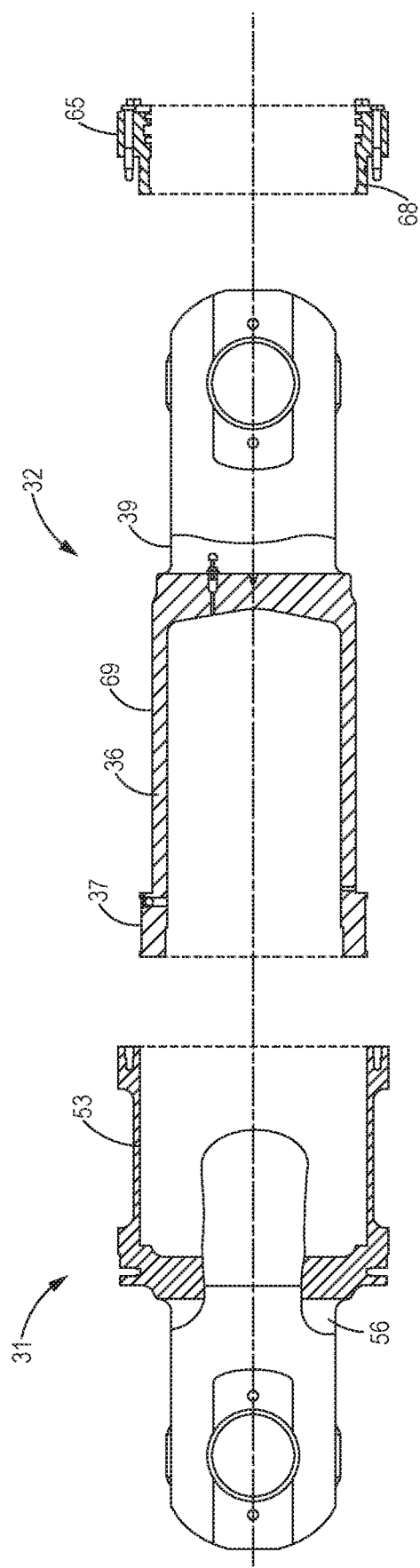

CLEVIS-ENDED SUSPENSION STRUT MANUFACTURED WITHOUT WELDS

TECHNICAL FIELD

The present disclosure generally relates to work machines and, more particularly, relates to a suspension strut associated with work machines.

BACKGROUND

Work machines, such as, a Large Mining Truck, include a load carrying body that is subject to multiple loading and unloading operations, due to which the load carrying body is raised and lowered a number of times with respect to a frame of the machine. Additionally, when loaded, the work machine can travel over rough terrain causing forces and vibrations to be transferred to the load carrying body. Suspension struts are placed between the load carrying body and an axle of the work machine to support the load carrying body and dampen any forces or vibration from the axle to the load carrying body.

Traditional suspension struts may include a housing assembly that slidably accommodates a rod and piston assembly. Gas or hydraulic oil may be introduced into a cavity of the suspension strut through an external valve port that passes the gas or hydraulic fluid through a clevis channel located in a clevis that is welded to the suspension strut. However, having a housing assembly welded from multiple pieces introduces wear points that are susceptible to failure from wear and tear of the work machine.

U.S. Pat. No. 9,285,006 B2, entitled "Shock Absorber," and assigned to Hitachi Automotive Systems LTD., discloses a shock absorber. The shock absorber of the '006 patent includes a piston inserted into a cylinder having a hydraulic oil sealed therein. An outer tube is provided around the outer periphery of the cylinder to form a reservoir between the cylinder and the outer tube. A circular cylindrical casing, formed by forging, is joined to a side surface portion of the outer tube, and the casing houses a damping force control valve.

However, there is still a need for an effective way to manufacture a suspension strut that does not require welding to increase the structural integrity of the suspension strut.

SUMMARY

In one aspect, the present disclosure relates to a suspension strut for use on a work machine between an axle and a load carrying body. The suspension strut may include a one piece cylindrical inner housing having a hollow rod that forms a circumferential piston at an open end and a lower clevis at a closed end. The lower clevis may be used to attach the inner housing to the axle, and a first interior fluid reservoir extends between the open and closed ends of the hollow rod. The suspension strut may further include a one piece cylindrical outer housing having a hollow barrel that has an interior and an exterior surface, a closed end that forms an upper clevis, an open end, and a port on an outside surface of the hollow barrel. The upper clevis may be used to attach the outer housing to the load carrying body, and an outer surface of the cylindrical piston is in slideable engagement with the interior surface of the hollow barrel. The suspension strut may further include a disk shaped end cap coupled to the open end of the hollow barrel that has an inner diameter in slideable engagement with an outer surface of hollow rod. The inner diameter of the end cap may be smaller than an outer diameter of the circumferential piston, and the disk shaped end cap may form a second fluid reservoir defined by a bottom surface of the circumferential piston, the interior surface of the hollow barrel, the outer surface of the of the hollow rod, and a top surface of the end cap.

In another aspect, the present disclosure relates to a method of manufacturing a suspension strut for a work machine having an axle and a load carrying body. The method includes forging, out of alloy steel, a one piece cylindrical inner housing having a hollow rod that forms a circumferential piston at an open end and a lower clevis at a closed end of the hollow rod. The lower clevis is capable of being attached to the axle, and a first fluid reservoir extends between the open and closed ends of the hollow rod. The method further includes forging, out of alloy steel, a one piece cylindrical outer housing having a hollow barrel that may have an interior and an exterior surface, a closed end that forms an upper clevis, and an open end. The outer housing may also include a port. The upper clevis is capable of being attached to the load carrying body. After forging the inner and outer housing, they are heat treated and machined to remove excess material. The method may further include providing a disk shaped end cap that has an inner diameter. The inner diameter of the end cap is smaller than an outer diameter of the circumferential piston, and the closed end of the hollow rod is placed through the inner diameter of the end cap. After placement, the inner diameter of the end cap may be slideably engaged with an outer surface of the hollow rod. The method may also include coupling the end cap to the open end of the hollow barrel to provide slideable engagement between an outer surface of the circumferential piston and an inner surface of the hollow barrel. The coupling with the disk shaped end cap may form a second fluid reservoir defined by a bottom surface of the circumferential piston, the interior surface of the hollow barrel, the outer surface of the hollow rod, and a top surface of the end cap.

Further, one aspect of the present disclosure may include a method of adjusting the ride height of a work machine, the method may include providing the work machine having an axle, a load carrying body, and a suspension strut. The suspension strut may have a one piece cylindrical inner housing that forms a hollow rod that having a circumferential piston at an open end and a lower clevis at a closed end. The lower clevis may attach to the axle, and a first interior fluid reservoir may extend between the open and closed ends of the hollow rod. The suspension strut further has a one piece cylindrical outer housing having a hollow barrel that has an interior and an exterior surface, a closed end that forms an upper clevis, an open end, and a port on an outside surface of the hollow barrel. The upper clevis may attach to the load carrying body, and an outer surface of the cylindrical piston may be in slideable engagement with the interior surface of the hollow barrel. The suspension strut further may have a disk shaped end cap coupled to the open end of the hollow barrel and include an inner diameter in slideable engagement with an outer surface of hollow rod. The inner diameter of the end cap may be smaller than an outer diameter of the circumferential piston, and the disk shaped end cap may form a second fluid reservoir defined by a bottom surface of the circumferential piston, the interior surface of the hollow barrel, the outer surface of the of the hollow rod, and a top surface of the end cap. A hydraulic fluid or gaseous fluid may be sealed inside of the first and second fluid reservoirs, and the hydraulic fluid or gaseous fluid may flow from the first reservoir to the second fluid reservoir through a check valve when the circumferential piston is moved towards the closed end of the hollow barrel. The method may further include opening up the port to unseal the first fluid reservoir, pumping additional gaseous fluid or hydraulic oil through the port, and sealing the port.

These and other aspects and features of the present disclosure will be more readily understood when read in conjunction with the accompanying drawings.

BRIEF DESCRIPTION OF THE DRAWINGS

FIG. 5 is diagrammatic sectional view of an exemplary embodiment of an outer housing of a suspension strut, according to aspects of the present disclosure;

FIG. 6 is a diagrammatic sectional view of an exemplary embodiment of an inner housing of a suspension strut, according to aspects of the present disclosure;

FIG. 7 is a diagrammatic sectional view of an exemplary embodiment of an end cap of a suspension strut, according to aspects of the present disclosure.

While the present disclosure is susceptible to various modifications and alternative constructions, certain illustrative embodiments thereof will be shown and described in detail. The disclosure is not limited to the specific embodiments disclosed, but instead includes all modification, alternative constructions, and equivalents thereof.

DETAILED DESCRIPTION

Figure 1:
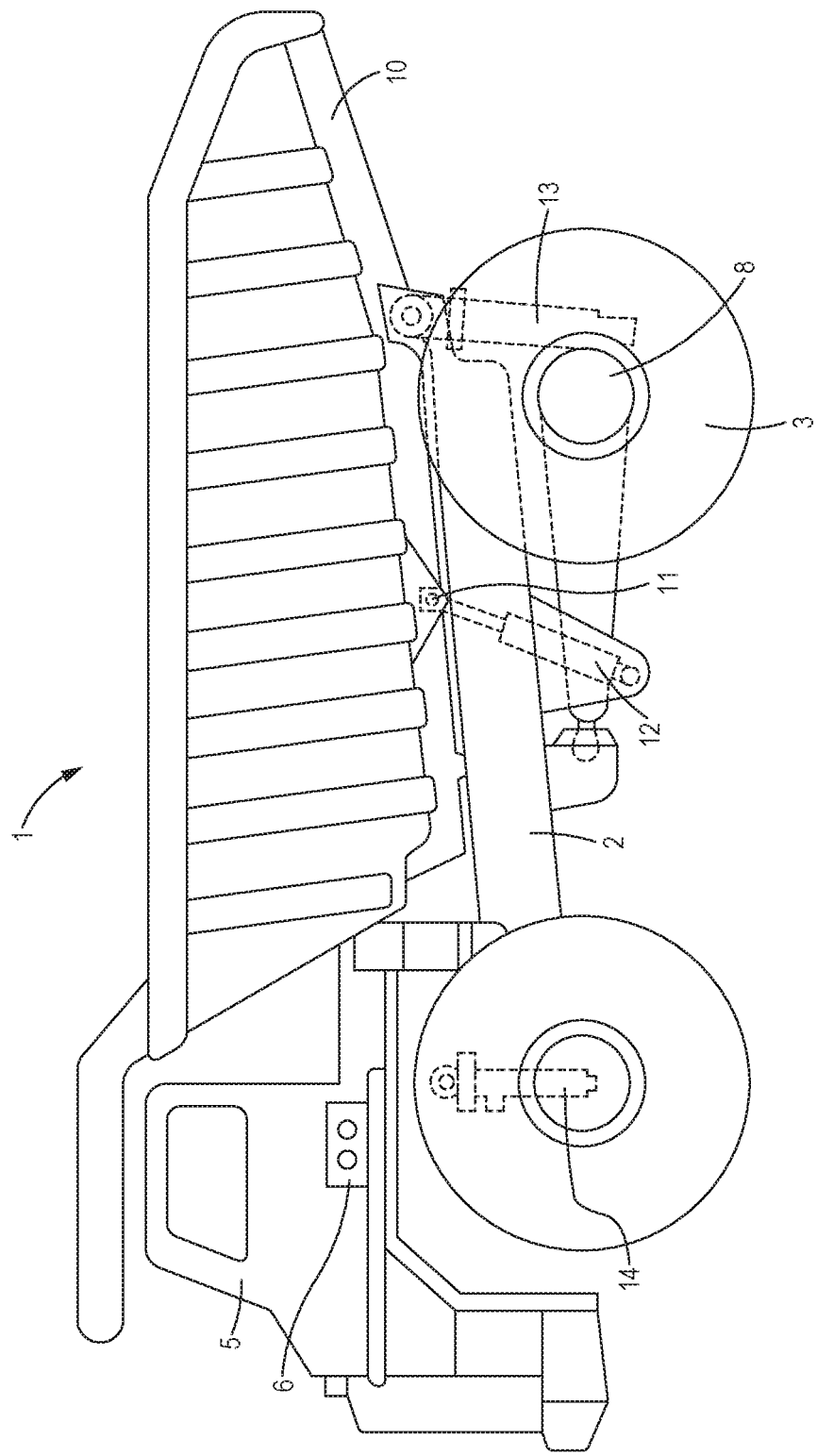
FIG. 1 is a side view of a work machine, in accordance with one embodiment of the present disclosure.

Referring now to the drawings, and with specific reference to FIG. 1, a work machine consistent with certain embodiments of the present disclosure is generally referred to by reference numeral 1. Although the work machine 1 is illustrated as a Large Mining Truck (LMT), the work machine 1 is shown primarily for illustrative purposes to assist in disclosing features of various embodiments, in that FIG. 1 does not depict all of the components of a work machine. Moreover, the readings of this disclosure can be employed on other earth moving and construction machines as well.

The work machine 1 may comprise a machine frame 2 supported by the rear wheels 3 and the front wheels 4. Although the front 4 and rear wheels 3 are shown, other support and movement devices (not shown) may be tracks or of any other type. Mounted on the frame 2 may be a cab 5 in which the operator of the work machine 1 sits. As should be appreciated by one of ordinary skill in the, an engine 6 may provide propulsion power to the wheels. The work machine further includes an axle 8 attached to the rear wheels 3, and a load carrying body 10. The load carrying body is connected to the frame 2 by a pivot pin 11, and a hydraulic cylinder 12 such that the contents of the load carrying body 10 can be removed by controllably pressuring the cylinder 12 to effect pivotal movement of the load carrying body 10 about the pivot pin 11. The cylinder may be actuated by any number of hydraulic pumps and tubes (not shown) powered by the engine 6 or other powering means. In a transport mode, the cylinder 12 is not pressurized and the weight of the load carrying body 10 is transferred to the frame through the pivot pin 11 and a rear suspension strut 13 that is between the axle 8 and the load carrying body 10. While the disclosure is directed primarily to rear suspension struts, such as, rear suspension strut 13, those skilled in the art will realize that the principles described here are applicable to front suspension struts, such as front suspension strut 14, as well.

Figure 2:
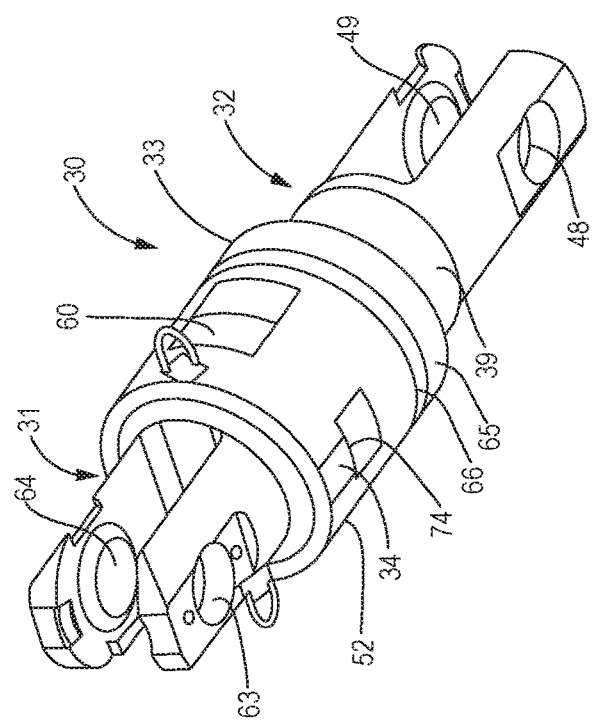
FIG. 2 diagrammatic illustration of an exemplary embodiment of a suspension strut for a work machine, according to aspects of the present disclosure.
Figure 3:
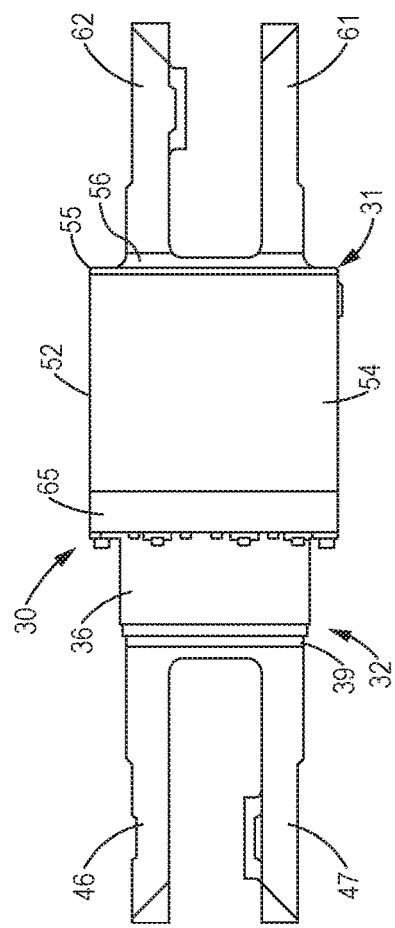
FIG. 3 is a diagrammatic side view of the suspension strut of FIG. 3, according to aspects of the present disclosure.
Figure 4:
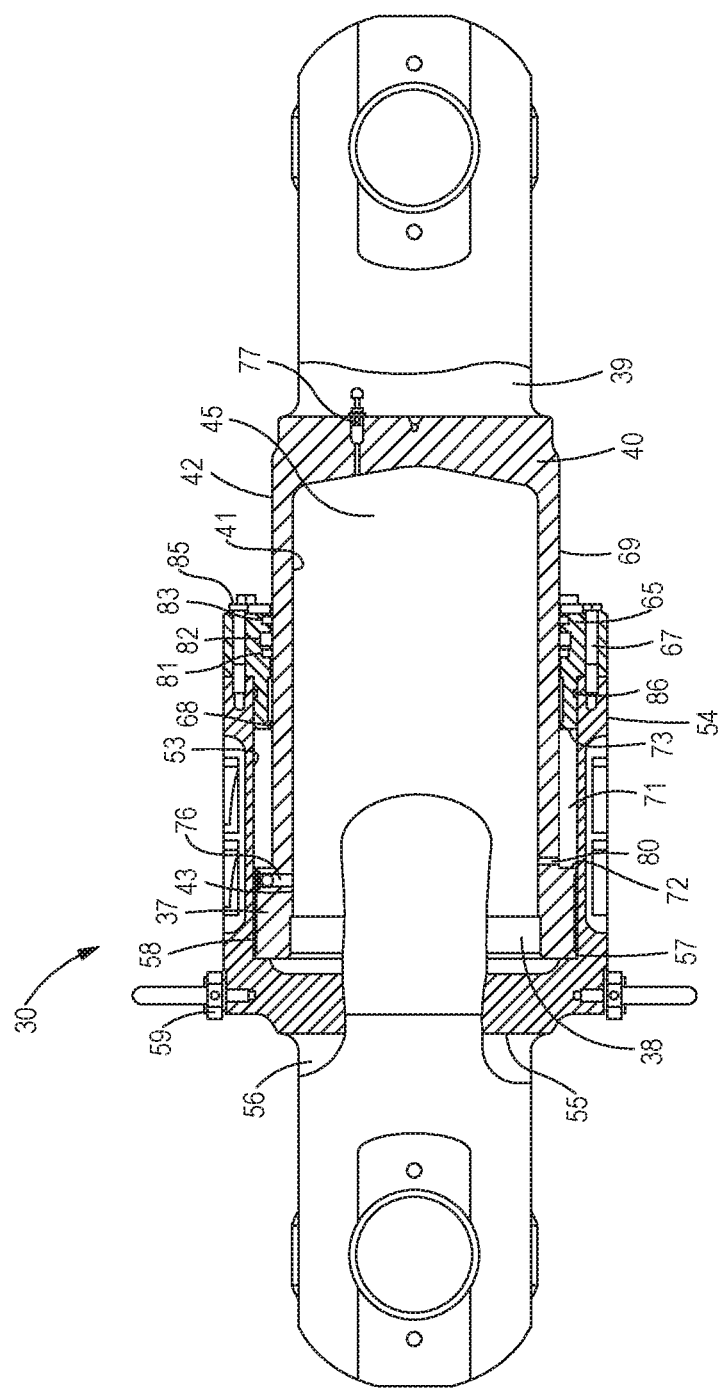
FIG. 4 is a diagrammatic sectional view of the suspension strut of FIG. 4, according to aspects of the present disclosure.

Referring to FIGS. 2-4, an exemplary embodiment of a suspension strut 30 having a one piece outer housing 31 and a one piece inner housing 32, coupled together by an end cap (discussed below), is shown. Instead of being fabricated as an assembly of multiple pieces attached via welds, each of the outer housing 31 and the inner housing 32 are single unitary components formed via forging (superheated cylindrical members urged against a center, axially aligned die to form voids), which results in integration of the port 34 (discussed below) into the upper housing 31.

As best shown in FIG. 4, the one piece cylindrical inner housing has a hollow rod 36 that defines a circumferential piston 37 at on open end 38 of the hollow rod 36, and a lower clevis 39 at a closed end 40 of the hollow rod 36. The hollow rod may have an inner diameter 41 and an outer diameter 42. In this embodiment, the circumferential piston 37 may have an inner diameter 43 and an outer diameter 44, the inner diameter 43 may at least partially be the same as the inner diameter 41 of the hollow rod 36 and the outer diameter 44 of the circumferential piston 37 may be larger than the outer diameter 42 of the hollow rod 36. The hollow rod forms a first fluid reservoir 45, as best shown in FIG. 4, that extends between the open and closed ends 38, 40, of the hollow rod 36. Further, as best shown in FIG. 3, the lower clevis 39 may further include first and second elongated members 46, 47 extending from the closed end of the hollow rod 40. The elongated members 46, 47, as shown in FIG. 2, may define first and second apertures 48, 49. The elongated members 46, 47, and the apertures 48, 49, allow the lower clevis 39 to attach to an axle 8 of a work machine 1.

The one piece cylindrical housing has a hollow barrel 52 that has an interior surface 53 and an exterior surface 54. Formed on a closed end 55 of the hollow barrel 52 is an upper clevis 56 that is configured to attach to the load carry body 10 of a work machine 1. In one embodiment, an outer surface 57 of the circumferential piston is in slideable engagement with the interior surface 53 of the hollow barrel. In a further embodiment, one or more bearings 58 may be placed between the circumferential piston 37 and the interior surface 53 of the hollow barrel 52 to assist in the slideable engagement. Further, an eye lift 59 may be attached to the exterior surface 54 of the hollow barrel 52 for lifting of the suspension strut 30. As shown in FIG. 2, warning and informational labels 60, or nameplates 74, having indicia may be placed on the exterior surface 54 of the hollow barrel 52. Further, as best shown in FIG. 3, the upper clevis 56 may further include a third and fourth elongated members 61, 62 extending from the closed end of the hollow barrel 52. The elongated members 61, 62, as shown in FIG. 2, may define a third and a fourth apertures 63, 64. The elongated members 61, 62, and the apertures 63, 64, allow the upper clevis 56 to attach to the load carrying body 10 of a work machine 1.

To seal the suspension strut 30 and prevent the inner housing 32, having the circumferential piston 37 in slideable engagement with the interior surface 53 of the hollow barrel, from sliding out, a disk shaped end cap 65 is provided. The end cap 65 is coupled to an open end 61 of the hollow barrel 52. This coupling may be done with one or more bolts 67 or other coupling means. An inner diameter 68 of the end cap 65 may be in slideable engagement with an outer surface 69 of the hollow rod 36, allowing the hollow rod 36 to extend and retract into hollow barrel 52. In one exemplary embodiment, the disk shaped end cap 65 may form a second fluid reservoir 71 that is defined by a bottom surface 72 of the circumferential piston 37, the interior surface 53 of the hollow barrel 53, the outer surface 69 of the hollow rod 36, and a top surface 73 of the end cap. The second fluid reservoir 71 allows for one more liquid or gaseous fluids to flow between the first and second reservoirs 45, 71 during the retracting and extending of the inner housing 32 into and out of the outer housing 31.

In one exemplary embodiment, the hollow barrel 52 may further include a port 34 located on its exterior surface 54. The port 34 may further comprise one or more apertures (not shown) sealed by a sealing plate (not shown). The one or more apertures extend from the inner surface 53 of the hollow barrel 52 to its exterior surface 54, and allows for the pumping of fluids through the port 34 into the first fluid reservoir 45. These fluids may include liquid fluids, such as hydraulic oil including 10 W hydraulic oil or equivalent, and gaseous fluids, such as nitrogen or other gaseous fluids used in suspension struts.

In manufacturing of the suspension strut 30, the inner housing 32, a one piece body forming the hollow rod 36, the circumferential piston 37, and the lower clevis 39, is forged as a one piece housing out of an alloy steel. Further, the outer housing 31, a one piece body forming the upper clevis 56 and hollow barrel 52 having the internal port 34, is forged as a one piece housing out of an alloy steel. The alloy steel used to form the inner and outer housing 31, 32, may be a 4130 steel or other alloy steel compound. After the forging, the inner and outer housings 31, 32, are heat treated, and then machined to remove any excess material from the forging process. Particularly, the upper and lower clevis 56, 39, are machined to remove excess materials to form the first, second, third, and elongated members 46, 47, 61, 62, as well as their corresponding apertures, including the first, second, third, and fourth apertures 48, 49, 63, 64. After the machining, the inner housing 32 is placed through the end cap 65, before the end cap 65 is coupled to the outer housing 31, thus assembling the one piece outer housing 31 and one piece inner housing 32 into the suspension strut 30.

Once assembled, a charging operation is performed on the suspension strut 30. The charging operation includes first pumping, at atmospheric pressure, a liquid fluid, such as hydraulic oil, through the port 34 and into the first fluid reservoir 45 until the inner housing 32 starts to extend from the outer housing 31 between 0.5 to 2 inches. This extending happens when the liquid fluid begins to fill the first fluid reservoir 45, and the circumferential piston 37 begins to move towards the open end 66 of the hollow barrel 52. After the extension of the inner housing 32, a gaseous fluid, such as nitrogen, is pumped under pressure through the port 34 and into the first fluid reservoir 45. This pumping of the gaseous fluid may cause any air inside of the suspension strut to flow out through a vent hole (not shown) of the port 34, and further cause the inner housing 32 to extend. Once a desired ride height is reached, the port 34 is sealed with, in one exemplary embodiment, the sealing plate, but other sealing means may be used.

Once manufactured and attached to the work machine, the hydraulic oil will sit at the bottom of the first fluid reservoir 45, and the gaseous fluid will sit on top of the hydraulic oil in the first fluid reservoir 45. The gaseous fluid provides the springing mechanism of the suspension strut. When a force is applied to either the axle 8 or the load carrying body 10, the inner housing 32 will be retracted into the outer housing 31, causing the circumferential piston 37 to move towards the closed end 55 of the hollow barrel 52. This retracting will cause the liquid and gaseous fluids to mix. Because the gaseous fluid is compressible and the liquid fluid is not, the pressure inside of the first hydraulic reservoir 45 will increase, causing a mixture of the liquid and gaseous fluids to pass through a check valve 76 and into the second fluid reservoir 71. The check valve 76 may be a pressure valve, only allowing the passage of fluids after reaching a pressure limit. The suspension strut 30 will then stabilize, and the fluids will pass from the second fluid reservoir 71 back to the first fluid reservoir 45 through a drill hole 80 located in the wall of the hollow rod 36, causing the circumferential piston 37 to extend towards the open end 66 of the hollow barrel 52. This retracting and extending of the inner housing 32 into and out of the outer housing 31 allows the suspension strut 30 to absorb forces and prevent the forces from being transferred to the load carrying body 10 from the axle 8, or the axle 8 to the load carrying body 10.

In another embodiment, after being attached to the work machine 1, the ride height of the load carrying body 10 may be adjusted by first unsealing the first fluid reservoir 45 by removing the sealing plate, or other sealing means. Once unsealed, further liquid fluids (at atmospheric pressure) or gaseous fluids (greater than atmospheric pressure), may be pumped through the port until a desired ride height is achieved. If the ride height is desired to be lowered, the liquid or gaseous fluids can be drained through a drain valve 77. It is desirable to place the drain valve at the closed end 40 of the hollow rod 52 as to let the fluids drain by gravity from the reservoirs.

Further, end cap bearings 78 may be present between the end cap 65 and the outer surface 69 of the hollow rod 36. To better seal the suspension strut and prevent the fluids from leaking out, or debris from getting inside, between the end cap and the hollow rod, the end cap 65 may further include a primary pressure seal 81 as a pressure or lubricated fluid seal, a second protective seal 82, and a debris seal 83. Further, the end cap 65 may include a cover plate 85 that is used to cover the bolts 67 that secure the end cap 65 to the hollow barrel 52. This cover plate 85 serves to prevent users from unbolting the end cap 65 because the content of the reservoirs are under pressure when sealed 65. In one embodiment, the end cap 65 may include safety channels (not shown), that allow a small amount of pressurized fluid to pass from the second fluid reservoir 71, or first fluid reservoir 45 in some embodiments, to the connection between the end cap 65 and cover plate 85. Thus, in this embodiment, when a user tries to remove the cover plate 85, as small amount of pressurized fluid is released, warning the user that the suspension strut 30 contains fluids under pressure. Additionally, a further seal ring 86 may exist between the end cap 65 and the interior surface 53 of the hollow barrel 52.

INDUSTRIAL APPLICABILITY

In general, the foregoing disclosure finds utility in various applications, such as, in earthmoving, construction, industrial, agricultural, mining, transportation, and forestry machines. In particular, the disclosed suspension strut may be used by Large Mining Trucks (LMTs) and other applications, such as, a smaller mining trucks and the like. By applying the disclosed suspension strut, method of manufacturing a suspension strut, and method of adjusting the ride height of a work machine optimum removal of failure points of traditional suspension struts and manufacturing efficiency of suspension struts may be achieved.

In particular, the disclosed suspension strut provides a one piece inner housing and one piece outer housing each forged as a single component, removing the need for welding. Furthermore, the suspension strut may be attached to the axle and load carrying body of a large mining truck and is designed to allow for the adjustment of the ride height of a load carrying body of a work machine with the suspension strut attached, minimizing interference with mining operations.

Figure 8:
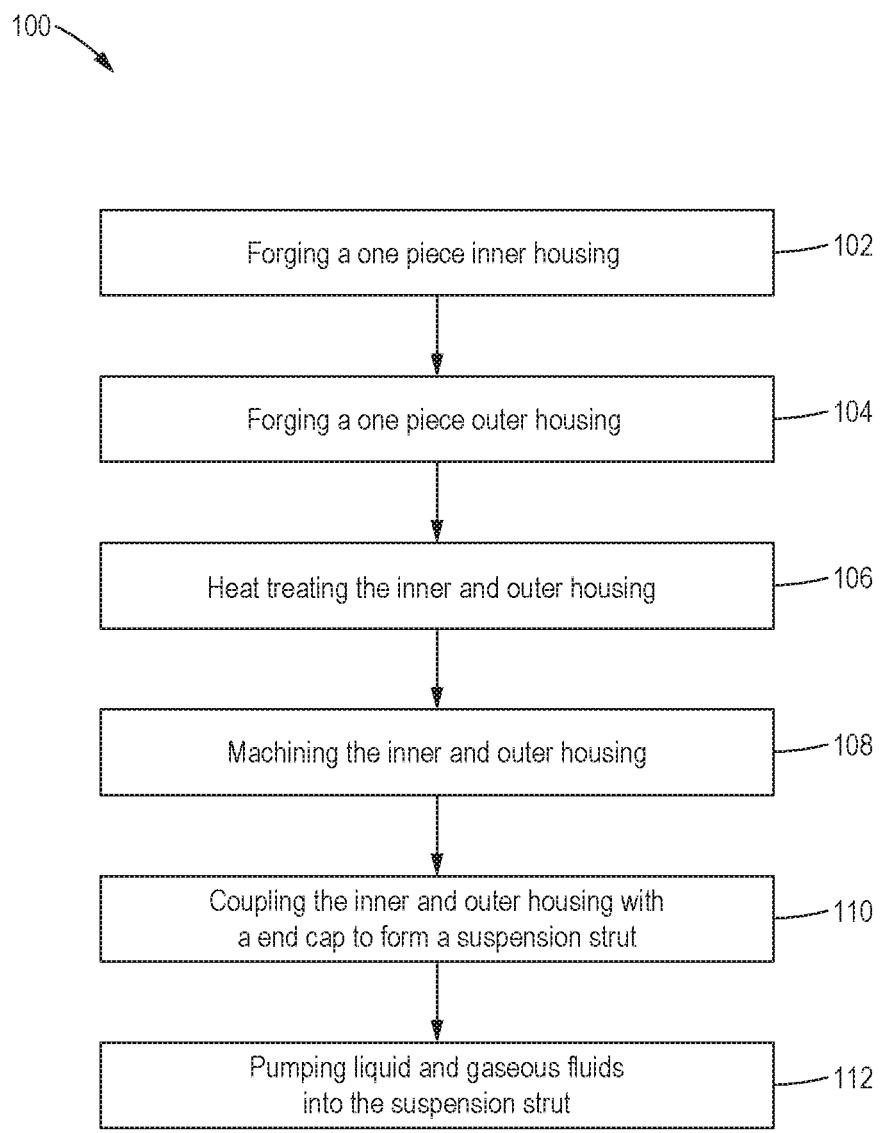
FIG. 8 is a flowchart illustrating an example process for manufacturing a suspension strut, according to aspects of the present disclosure.

Turning now to FIG. 8, with continued references to FIGS. 2-7, a flowchart illustrating an example process 100 for manufacturing a work machine is disclosed. At blocks 102-104, the one piece inner housing 32 and the one piece outer housing 31 are forged. As shown in FIG. 6, inner housing 32 including the circumferential piston 37, the hollow rod 36, and the lower clevis 39 forged as a one piece construction. As shown in FIG. 5, the outer housing 31 including the upper clevis 56 and the hollow barrel 52 forged as a one piece construction.

At block 106, the inner and outer housings 32, 31, are heat treated before being machined in block 108 to remove excess materials from the forging process. Excess materials may include removing excess alloy steel from the upper and lower clevis 56, 39.

At block 110, inner housing 32 is inserted through the end cap 65, as shown in FIG. 7, and the end cap is coupled to the outer housing 31 to form the suspension strut 30. At block 110, a charging procedure is performed by pumping liquid and gaseous fluids into the suspension strut through an internal port located on the side of the hollow barrel 52.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A suspension strut for use on a work machine between an axle and a load carrying body, comprising:
    a forged one piece cylindrical inner housing comprising a hollow rod that defines a circumferential piston at an open end and a lower clevis at a closed end, in which the lower clevis is configured to attach to the axle and a first fluid reservoir extends between the open and closed ends of the hollow rod, the hollow rod being entirely hollow in an inner volume inward of an interior surface and between the open and closed ends thereof;
    a forged one piece cylindrical outer housing comprising a hollow barrel having an interior and an exterior surface, a closed end that forms an upper clevis, an open end, and a port on an outside radial surface of the hollow barrel, in which the upper clevis is configured to attach to the load carrying body and an outer surface of the circumferential piston is in slideable engagement with the interior surface of the hollow barrel, the hollow barrel being entirely hollow in an inner volume inward of the interior surface thereof and between the open and closed ends; and
    a disk shaped end cap coupled to the open end of the hollow barrel having an inner diameter in slideable engagement with an outer surface of hollow rod, in which the inner diameter of the end cap is smaller than an outer diameter of the circumferential piston, the disk shaped end cap forming a second fluid reservoir defined directly by a bottom surface of the circumferential piston, the interior surface of the hollow barrel, the outer surface of the hollow rod, and a top surface of the end cap,
    wherein the disk shaped end cap coupled to the open end of the hollow barrel is exposed so as to be viewable in a side elevational view of the suspension strut and so as to form an outer sidewall portion of the suspension strut, and
    wherein the forged one piece cylindrical inner housing defines a drain valve at the closed end thereof,
    wherein the circumferential piston at the open end of the hollow rod, which is part of the forged one piece cylindrical inner housing, forms an end-most portion of the forged one piece cylindrical inner housing,
    wherein the port on the outside radial surface of the hollow barrel is adjacent to the closed end of the hollow barrel,
    wherein the port extends from the outer surface of the hollow barrel to the inner surface of the hollow barrel, and is configured and sized to allow a fluid to be pumped therethrough into the first fluid reservoir, and
    wherein a space exists, in a longitudinal direction of the suspension strut, between the open end of the hollow rod and the closed end of the hollow barrel under a condition where the one piece cylindrical inner housing is fully retracted within the hollow barrel of the one piece cylindrical outer housing and abuts the closed end of the hollow barrel.

2. The suspension strut of claim 1,
    wherein the upper and lower clevis each further comprise two elongated members that independently define an aperture, the aperture configured for attachment to the work machine, and
    wherein each of the upper and lower clevis has a projection extending from one of the two elongated members toward the other of the two elongated members.

3. The suspension strut of claim 1, wherein the fluid is a hydraulic oil and the fluid is pumped through the port until the one piece inner cylindrical housing begins to extend from the one piece outer cylindrical housing, after the one piece inner cylindrical housing begins to extend a second fluid comprising a gas is pumped through the port and the port sealed.

4. The suspension strut of claim 1,
wherein the circumferential piston further comprises a check valve, the check valve configured to allow a fluid to flow from the first fluid reservoir into the second fluid reservoir when the circumferential piston is moved towards the closed end of the hollow barrel, and
wherein the check valve is oriented perpendicular to the longitudinal direction of the suspension strut.

5. The suspension strut of claim 4,
wherein the hollow rod further comprises one or more drill holes, the one or more drill holes being configured to allow a fluid to flow from the second fluid reservoir into the first fluid reservoir when the circumferential piston is moved away from the closed end of the hollow barrel, and
wherein each of the one or more drill holes is oriented perpendicular to the longitudinal direction of the suspension strut.

6. The suspension strut of claim 1, further comprising a pressure seal, a protective seal, and a debris seal between the inner diameter of the end cap and the outer diameter of the hollow rod.

7. The suspension strut of claim 1, wherein a circumferential top surface of the end cap is bolted onto a circumferential surface of the open end of the hollow barrel.

8. The suspension strut of claim 7, wherein a cover plate is bolted onto a circumferential bottom surface of the end cap, the cover plate configured to release a warning pressure from the second fluid reservoir.

9. The suspension strut of claim 1, wherein each of the one piece cylindrical outer housing and the one piece cylindrical inner housing is forged out of an alloy steel to be one piece.

10. The suspension strut of claim 1,
wherein an outer diameter of the disk shaped end cap is the same as an outer diameter of the outside surface of the hollow barrel,
wherein a first length of the hollow barrel is less than a second length of the hollow rod, and
wherein the outer housing is shorter than the inner housing.

11. The suspension strut of claim 1, wherein no portion of the one piece cylindrical outer housing extends into the hollow rod when the outer surface of the cylindrical piston is in slideable engagement with the interior surface of the hollow barrel.

12. The suspension strut of claim 10, wherein no portion of the one piece cylindrical outer housing extends into the hollow rod when the outer surface of the cylindrical piston is in slideable engagement with the interior surface of the hollow barrel.

13. The suspension strut of claim 2, wherein the drain valve extends in a length direction of the suspension strut, the drain valve being between the two elongated members of the lower clevis.

14. A suspension strut for use on a work machine between an axle and a load carrying body, comprising:
a forged one piece cylindrical inner housing comprising a hollow rod that defines a circumferential piston at an open end and a lower clevis at a closed end, in which the lower clevis is configured to attach to the axle and a first fluid reservoir extends between the open and closed ends of the hollow rod, the hollow rod being entirely hollow in an inner volume inward of an interior surface and between the open and closed ends thereof;
a forged one piece cylindrical outer housing comprising a hollow barrel having an interior and an exterior surface, a closed end that forms an upper clevis, an open end, and a port on an outside radial surface of the hollow barrel, in which the upper clevis is configured to attach to the load carrying body and an outer surface of the circumferential piston is in slideable engagement with the interior surface of the hollow barrel, the hollow barrel being entirely hollow in an inner volume inward of the interior surface thereof and between the open and closed ends; and
a disk shaped end cap coupled to the open end of the hollow barrel having an inner diameter in slideable engagement with an outer surface of hollow rod, in which the inner diameter of the end cap is smaller than an outer diameter of the circumferential piston, the disk shaped end cap forming a second fluid reservoir defined directly by a bottom surface of the circumferential piston, the interior surface of the hollow barrel, the outer surface of the hollow rod, and a top surface of the end cap,
wherein the disk shaped end cap coupled to the open end of the hollow barrel is exposed so as to be viewable in a side elevational view of the suspension strut and so as to form an outer sidewall portion of the suspension strut, and
wherein the forged one piece cylindrical inner housing defines a drain valve at the closed end thereof,
wherein the circumferential piston at the open end of the hollow rod, which is part of the forged one piece cylindrical inner housing, forms an end-most portion of the forged one piece cylindrical inner housing,
wherein the port on the outside radial surface of the hollow barrel is adjacent to the closed end of the hollow barrel,
wherein the port extends from the outer surface of the hollow barrel to the inner surface of the hollow barrel, and is configured to allow a fluid to be pumped therethrough into the first fluid reservoir, and
wherein the drain valve extends in a length direction of the suspension strut, the drain valve being between the two elongated members of the lower clevis such that an exit of the drain valve is between the two elongated members of the lower clevis and hidden by one of the two elongated members in a side view of the suspension strut.

15. The suspension strut of claim 14,
wherein a space exists, in a longitudinal direction of the suspension strut, between the open end of the hollow rod and the closed end of the hollow barrel when the one piece cylindrical inner housing is fully retracted within the hollow barrel of the one piece cylindrical outer housing,
wherein the circumferential piston further comprises a check valve, the check valve configured to allow a fluid to flow from the first fluid reservoir into the second fluid reservoir when the circumferential piston is moved towards the closed end of the hollow barrel, and
wherein the check valve is oriented perpendicular to the longitudinal direction of the suspension strut,
wherein the hollow rod further comprises one or more drill holes, the one or more drill holes being configured to allow a fluid to flow from the second fluid reservoir into the first fluid reservoir when the circumferential piston is moved away from the closed end of the hollow barrel, and
wherein each of the one or more drill holes is oriented perpendicular to the longitudinal direction of the suspension strut.

16. A suspension strut for use on a work machine between an axle and a load carrying body, comprising:
- a forged one piece cylindrical inner housing comprising a hollow rod that defines a circumferential piston at an open end and a lower clevis at a closed end, in which the lower clevis is configured to attach to the axle and a first fluid reservoir extends between the open and closed ends of the hollow rod, the hollow rod being entirely hollow in an inner volume inward of an interior surface and between the open and closed ends thereof;
- a forged one piece cylindrical outer housing comprising a hollow barrel having an interior and an exterior surface, a closed end that forms an upper clevis, an open end, and a port on an outside radial surface of the hollow barrel, in which the upper clevis is configured to attach to the load carrying body and an outer surface of the circumferential piston is in slideable engagement with the interior surface of the hollow barrel, the hollow barrel being entirely hollow in an inner volume inward of the interior surface thereof and between the open and closed ends; and
- a disk shaped end cap coupled to the open end of the hollow barrel having an inner diameter in slideable engagement with an outer surface of hollow rod, in which the inner diameter of the end cap is smaller than an outer diameter of the circumferential piston, the disk shaped end cap forming a second fluid reservoir defined directly by a bottom surface of the circumferential piston, the interior surface of the hollow barrel, the outer surface of the hollow rod, and a top surface of the end cap,
- wherein the disk shaped end cap coupled to the open end of the hollow barrel is exposed so as to be viewable in a side elevational view of the suspension strut and so as to form an outer sidewall portion of the suspension strut, and
- wherein the forged one piece cylindrical inner housing defines a drain valve at the closed end thereof,
- wherein the circumferential piston at the open end of the hollow rod, which is part of the forged one piece cylindrical inner housing, forms an end-most portion of the forged one piece cylindrical inner housing,
- wherein the port on the outside radial surface of the hollow barrel is adjacent to the closed end of the hollow barrel,
- wherein the port extends from the outer surface of the hollow barrel to the inner surface of the hollow barrel, and is configured and sized to allow a fluid to be pumped therethrough into the first fluid reservoir,
- wherein a space exists, in a longitudinal direction of the suspension strut, between the open end of the hollow rod and the closed end of the hollow barrel under a condition where the one piece cylindrical inner housing is fully retracted within the hollow barrel of the one piece cylindrical outer housing and abuts the closed end of the hollow barrel,
- wherein a circumferential top surface of the end cap is bolted onto a circumferential surface of the open end of the hollow barrel,
- wherein the drain valve extends in a length direction of the suspension strut, the drain valve being between the two elongated members of the lower clevis such that an exit of the drain valve is between the two elongated members of the lower clevis and hidden by one of the two elongated members in a side view of the suspension strut.

17. The suspension strut of claim 16,
- wherein the circumferential piston further comprises a check valve, the check valve configured to allow a fluid to flow from the first fluid reservoir into the second fluid reservoir when the circumferential piston is moved towards the closed end of the hollow barrel, and
- wherein the check valve is oriented perpendicular to the longitudinal direction of the suspension strut,
- wherein the hollow rod further comprises one or more drill holes, the one or more drill holes being configured to allow a fluid to flow from the second fluid reservoir into the first fluid reservoir when the circumferential piston is moved away from the closed end of the hollow barrel,
- wherein each of the one or more drill holes is oriented perpendicular to the longitudinal direction of the suspension strut,
- wherein an outer diameter of the disk shaped end cap is the same as an outer diameter of the outside surface of the hollow barrel,
- wherein a first length of the hollow barrel is less than a second length of the hollow rod,
- wherein the outer housing is shorter than the inner housing, and
- wherein no portion of the one piece cylindrical outer housing extends into the hollow rod when the outer surface of the cylindrical piston is in slideable engagement with the interior surface of the hollow barrel.

* * * * *